(12) United States Patent
Sailing

(10) Patent No.: US 11,897,039 B2
(45) Date of Patent: Feb. 13, 2024

(54) DUAL OPERATING TAPPING HEAD

(71) Applicant: Jerome Sailing, Carson City, NV (US)

(72) Inventor: Jerome Sailing, Carson City, NV (US)

(*) Notice: Subject to any disclaimer, the term of this patent is extended or adjusted under 35 U.S.C. 154(b) by 0 days.

(21) Appl. No.: 17/496,483

(22) Filed: Oct. 7, 2021

(65) Prior Publication Data

US 2022/0105581 A1   Apr. 7, 2022

Related U.S. Application Data

(60) Provisional application No. 63/088,793, filed on Oct. 7, 2020.

(51) Int. Cl.
   *B23B 31/08*      (2006.01)
   *B23G 1/18*       (2006.01)

(52) U.S. Cl.
   CPC .............. *B23B 31/086* (2013.01); *B23G 1/18* (2013.01); *B23B 2231/54* (2013.01)

(58) Field of Classification Search
   CPC ...... B23B 31/086; B23B 2231/54; B23G 1/18
   See application file for complete search history.

(56) References Cited

U.S. PATENT DOCUMENTS 3,946,844 A * 3/1976 Johnson ................. F16D 43/202
                                                     192/21
4,014,421 A * 3/1977 Johnson ............. B23B 31/20125
                                                     192/48.91

FOREIGN PATENT DOCUMENTS

EP            0051097 B1 * 10/1985

* cited by examiner

*Primary Examiner* — Eric A. Gates
*Assistant Examiner* — Reinaldo A Vargas Del Rio
(74) *Attorney, Agent, or Firm* — Dean A. Craine, P.S.

(57) ABSTRACT

A tapping head configured to hold and drive different size taps with a slip joint that introduces a small amount of play bet ween the tap head and the tap to compensate for excessive lead that may damage the tap or the workpiece. The tapping head includes a base, a drive coupler, a drive sleeve, a driver, a clutch pack, a pressure ring, a clutch cover, a drive cover and a lock nut. The driver and drive sleeve are longitudinally coupled by splines that form a slip joint. The clutch pact includes discs that against the inside surface of the base and lower surface of the pressure ring. Mounted on the lower surface of the pressure ring are a plurality of clutch springs that force the pressure ring upward against the clutch pack. Disposed between the drive couple and the driver are thrust springs that exert downward forces on the driver. The clutch cover includes internal threads configured to attach to external threads formed on the base. By tightening the clutch cover on the base, the force exerted by the thrust springs on the pressure ring can be adjusted to change the amount of frictional forces exerted by the clutch pack.

18 Claims, 11 Drawing Sheets

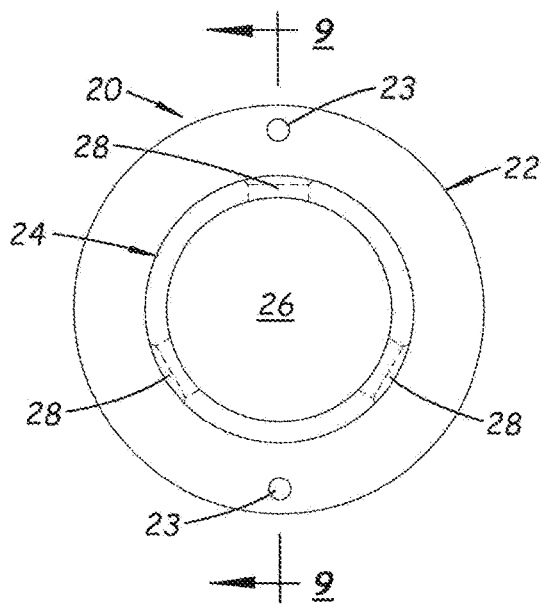
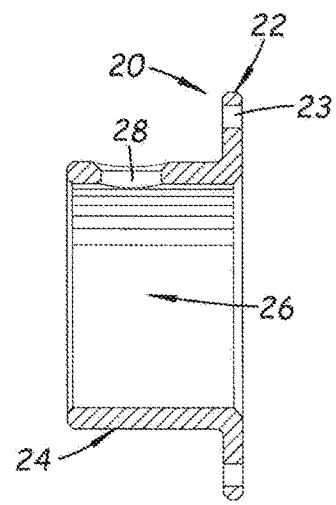
Fig. 8
Fig. 9
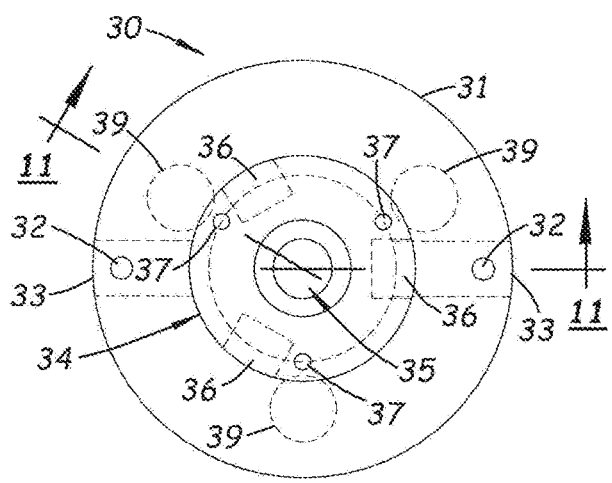
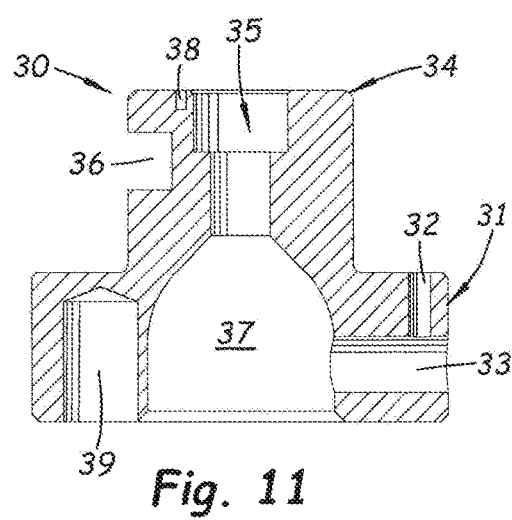
Fig. 10
Fig. 11

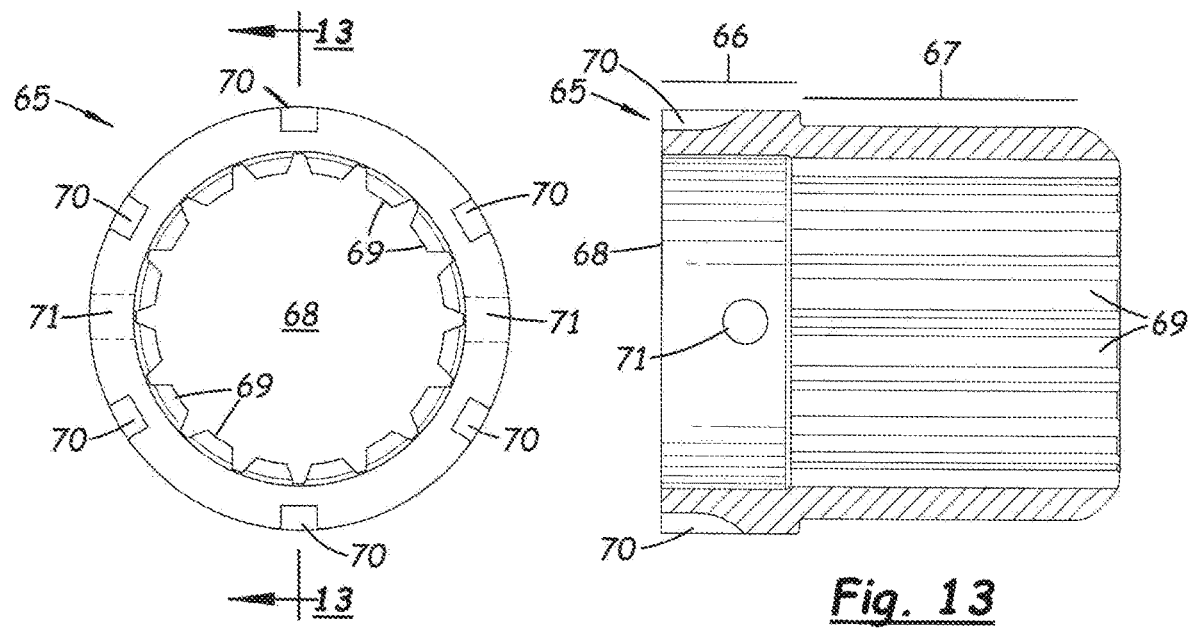
Fig. 12
Fig. 13
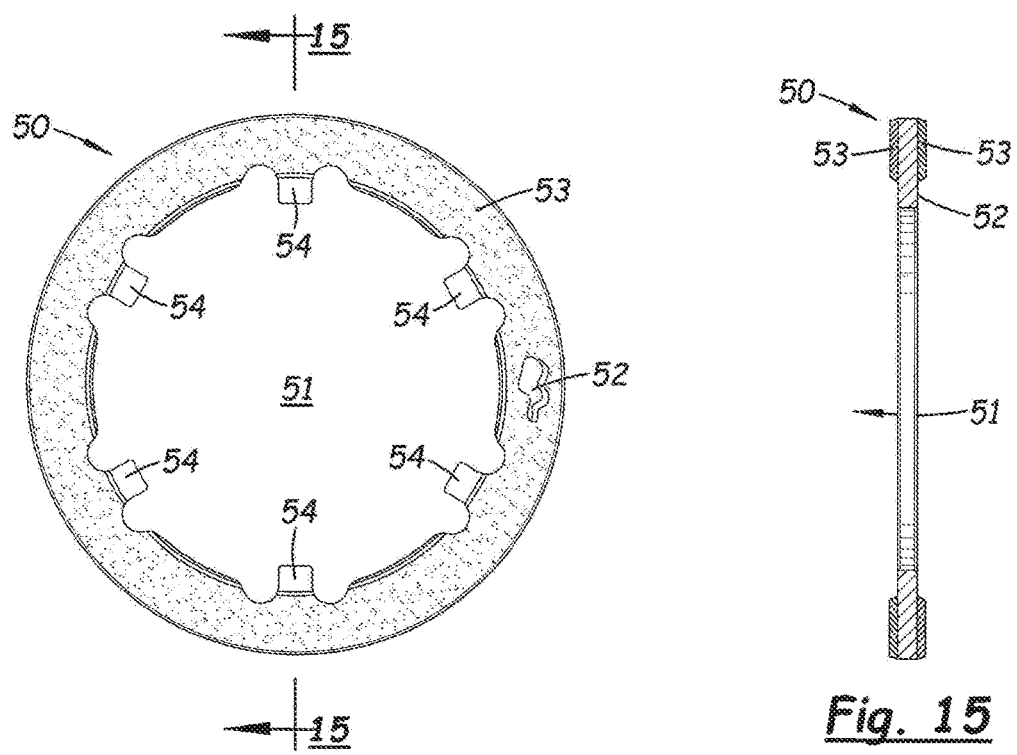
Fig. 14
Fig. 15

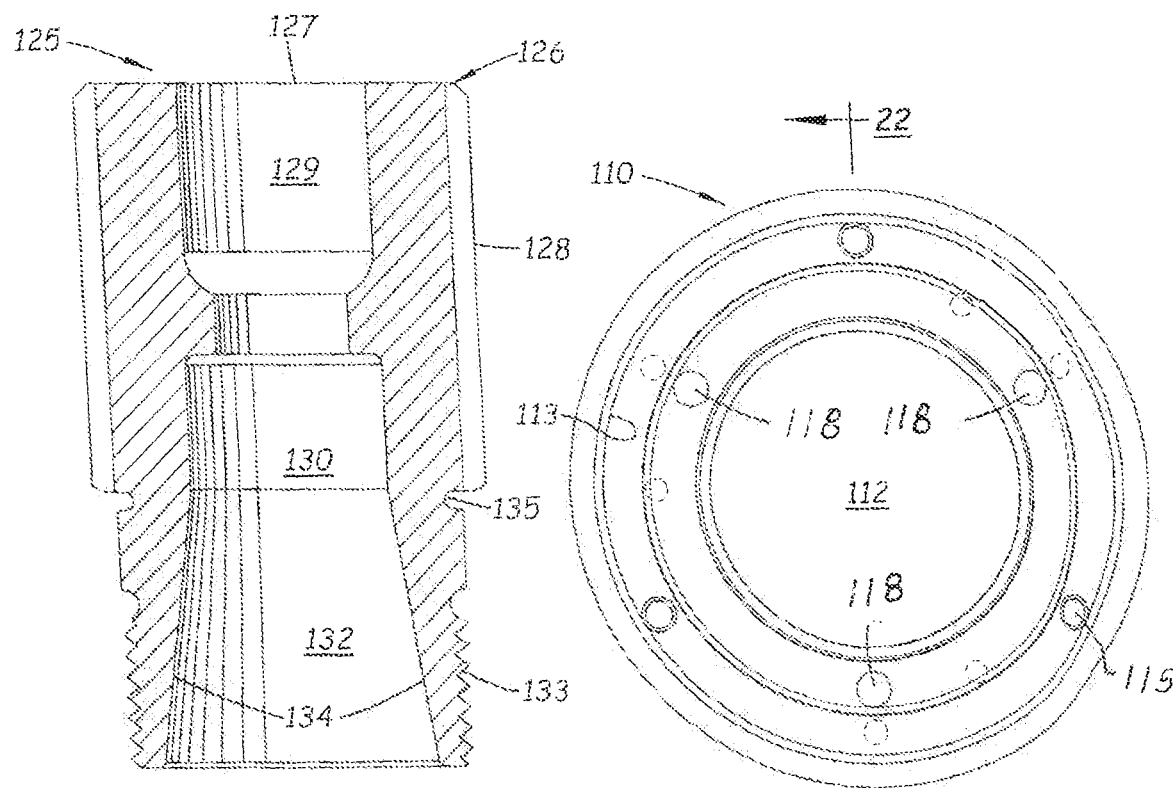
Fig. 20
Fig. 21
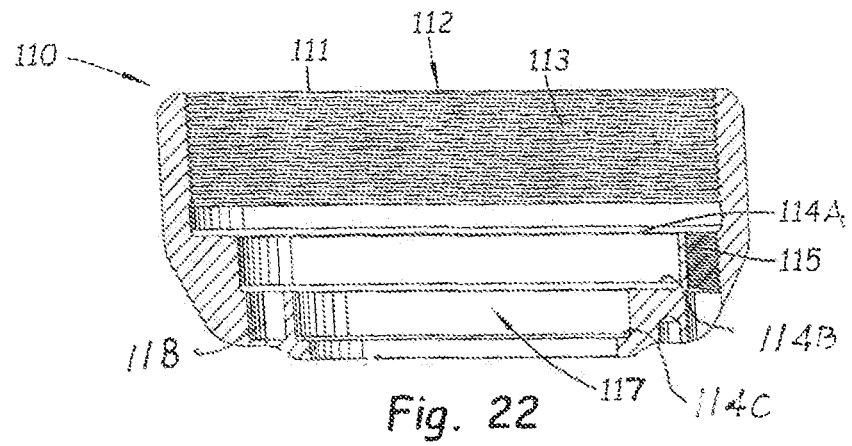
Fig. 22

DUAL OPERATING TAPPING HEAD

This non-provisional patent application is based on and claims the filing date benefit of U.S. provisional patent application (Application No. 63/088,793) filed on Oct. 7, 2020.

Notice is given that the following patent document contains original material subject to copyright protection. Accordingly, the copyright owner has no objection to the facsimile or digital download reproduction of all or part of the patent document but otherwise reserves all copyrights.

BACKGROUND OF THE INVENTION

1. Field of the Invention

The present invention generally relates to tapping heads used with CNC machines. More particularly, tapping heads reduce damage to the tap and damage to the workpiece caused by improper coordination of the axis feed drive and the spindle motor.

2. Description of the Related Art

The term "synchronizing" in the milling industry refers to synchronizing movement between a CNC machine's axis feed drive and the spindle motor. Typically, the machine programmer tells the CNC machine what feed to use by simply dividing ONE by the number of threads. This number is then multiplied by the spindle's RPM to calculate the actual feed rate, so the tap follows its pitch into the hole.

During, operation, CNC machines synchronize the motors used to feed and control the RPMs. Unfortunately, the motor in the CNC machine accelerates, deaccelerates, and reverses direction which can cause undesirable vibration and misalignment of the tapping head that can damage the tap and the threads formed in the workpiece.

What is needed is an improved tapping head that reduces vibration and misalignment and reduces damage to the tap and the workpiece.

SUMMARY OF THE INVENTION

A tapping head is configured to hold and drive different taps with a slip joint that introduces a small amount of play between the tap head and the tap to compensate for excessive lead that may damage the tap or the workpiece.

The tapping head includes a base configured to attach to a spindle on a milling machine. Connected to the inside cavity formed in the base is a drive coupler that connects to a driver configured to slide longitudinally inside a drive sleeve. Longitudinally aligned interior splines are formed on the drive sleeve that engages longitudinally aligned exterior splines formed on the upper section of the driver. During assembly, the driver is inserted into the drive sleeve. The two sets of splines radially lock the driver inside the drive sleeve and allow the driver to move inward and outward longitudinally. When assembled, the driver's end is exposed and receives the shaft on a tab. A lock nut attaches to the lower section of the driver to hold a tap securely on the end of the driver.

Located inside the lower cavity of the base and surrounding the upper section of the drive coupler is a clutch pack. The clutch pact includes one center support plate that slides longitudinally into the base and includes lugs that engage slots to hold the support plate in a fixed radial position on the base. Located on opposite sides of the support plate is at least one friction disc. In the embodiment shown herein, two friction discs are positioned on opposite sides of the support disc.

Extending between the bottom surface of the drive coupler and the upper end of the driver is a plurality of axially aligned thrust springs. During operation, the thrush springs force the driver down rom the drive coupler that forces the driver and the tap into the workpiece.

Disposed inside the base and under the lower friction disc is a circular pressure ring. Mounted on the pressure ring is a plurality of clutch springs that force the pressure ring upward and press against the clutch pack. The clutch pack includes two friction discs located on opposite sides of a support disc. When assembled, the two fiction discs press against the base's inside surface and the pressure ring's lower surface. When the tapping head is assembled, the clutch pack is disposed around the upper section of the drive coupler. The two friction discs include lugs that fit into slots formed on the upper section of the drive coupler that couple the two friction discs to the drive coupler. The support plate includes lugs that couple it to the base.

Located over the top surface of the base is a thrust plate that attaches to the top surface of the drive coupler. A retainer spring assembly that connects the base to the driver extends downward from the base. During use, the retainer spring assembly applies an upward biasing force to the driver, which provides an additional pulling force to the driver to quickly pull a tap attached to the driver from the workpiece.

Surrounding the drive coupler, the driver, the pressure ring, and the clutch pack is an outer clutch cover. The clutch cover includes internal threads configured to selectively attach to external threads formed on the base. Extending upward from the clutch cover is a plurality of drive pins that radially lock the clutch cover and the pressure ring. Thus, by tightening the clutch cover on the base, the force exerted by the thrust springs on the pressure ring can be adjusted. Also, by changing the amount of force exerted on the pressure ring, the amount of frictional forces exerted by the clutch pack can be adjusted.

Because the location of the clutch pack is affected by the clutch springs, the operator can easily change the feed rate of the tap without fear of damaging the tap. For example, the operator can program a machine's feed rate of about 90 to 95% of the mathematically perfect feed rate. The tap then advances the spindle's position a small amount per revolution, tensioning the lighter tension spring without risking tap damage.

When a lower driving force is needed (i.e., taps the 0-80 and 2-56 up to 4-40 sizes), the clutch cover is loosened on the base. When greater driving force is needed for larger taps (i.e., taps 5-40 up to ⅜-16 or ½-13), the clutch cover is tightened on the base to apply more force to the pressure ring, causing it to exert greater force against the clutch pack giving the tapping head more driving power.

If rigid tapping is desired, an optional lockup feature is provided that locks the clutch pack to the drive sleeve. To accomplish this, three dog screws extend inward from the base and press against the sides of the drive sleeve. When the dog screws are tightened, the drive sleeve is locked to the base, which makes the tapping head a solid driving unit with a slip joint.

BRIEF DESCRIPTION OF THE DRAWINGS

FIG. 8 is a bottom plan view of the bearing bushing.

FIG. 9 is a sectional view of the bearing bushing taken along line 9-9 in FIG. 8.

FIG. 10 is a top plan view of the drive coupler.

FIG. 11 is a sectional, side elevational view of the drive coupler taken along line 11-11 in FIG. 10.

FIG. 12 is a top plait view of the drive sleeve.

FIG. 13 is a sectional, side elevational view of the drive sleeve taken along line 13-13 in FIG. 12.

FIG. 14 is a top plan view of a clutch disc.

FIG. 15 is a sectional, side elevational view of the clutch disc taken along line 15-15 in FIG. 14.

FIG. 20 is a sectional, side elevational view of the driver.

FIG. 21 is a top plan view of the clutch cover.

FIG. 22 is a sectional view of the clutch cover taken along taken along line 22-22 in FIG. 21.

DESCRIPTION OF THE PREFERRED EMBODIMENT(S)

Figure 1:
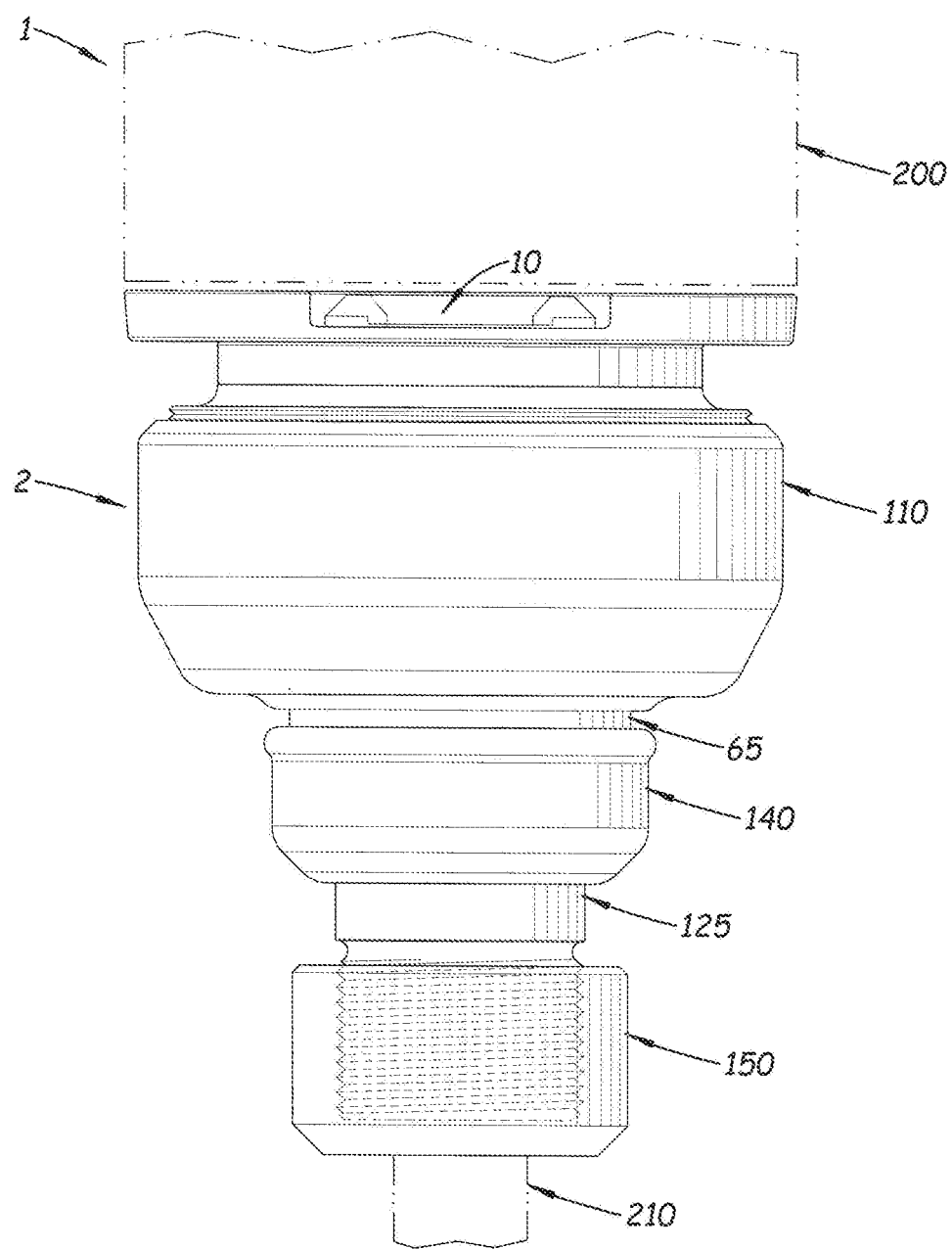
FIG. 1 is a side elevational view of the tapping head attached at its upper end to the end of a spindle and at its lower end to a tap.

Disclosed herein is a tapping head 1 configured to hold and drive different size taps 210 that includes a slip joint that introduces a small amount of axial movement or play between the tapping head 1 and the tap 210 to compensate for excessive lead that may damage the tap 210 or a workpiece. The tapping head 1 also includes an adjustable clutch pack 48 to prevent the tap 210 from breaking. Before operating, the clutch pack 48 allows the Operator to pre-load the clutch pack 48 to drive the tap 210 sufficiently but allows the clutch pack 48 inside the tapping head 1 to slide if the tap 210 becomes dull. The tapping head 1 also includes an optional lock-up feature that allows the operator to selectively lock and fully engage the clutch pack 48. The tanning head 1 also includes a driver 125 with external threads 133 configured to attach to a commercially available lock nut 150 that tightens the driver 125 to the tap 210.

Figure 2:
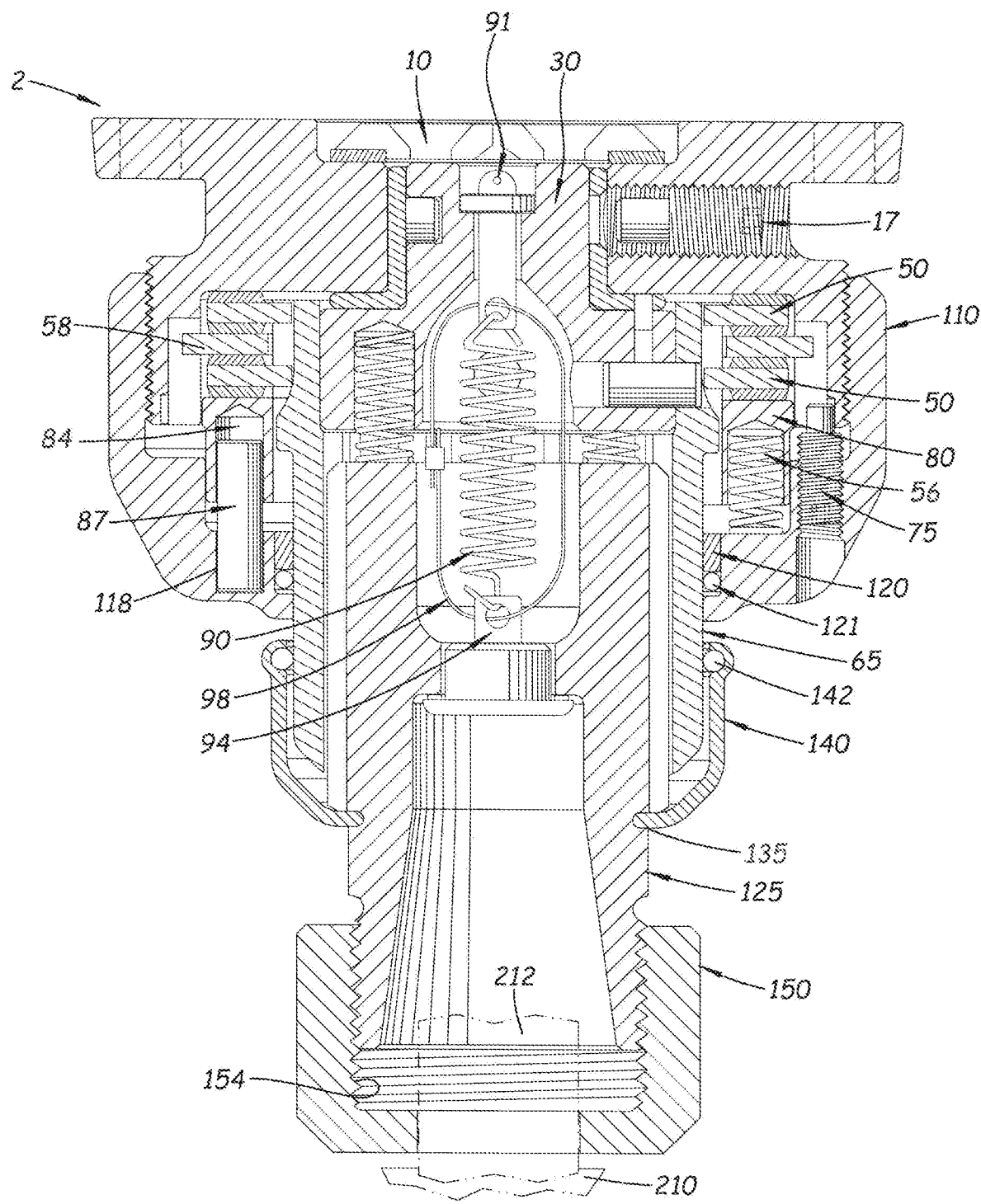
FIG. 2 is an enlarged, sectional, side elevational view of the tapping head shown in FIG. 1.
Figure 3:
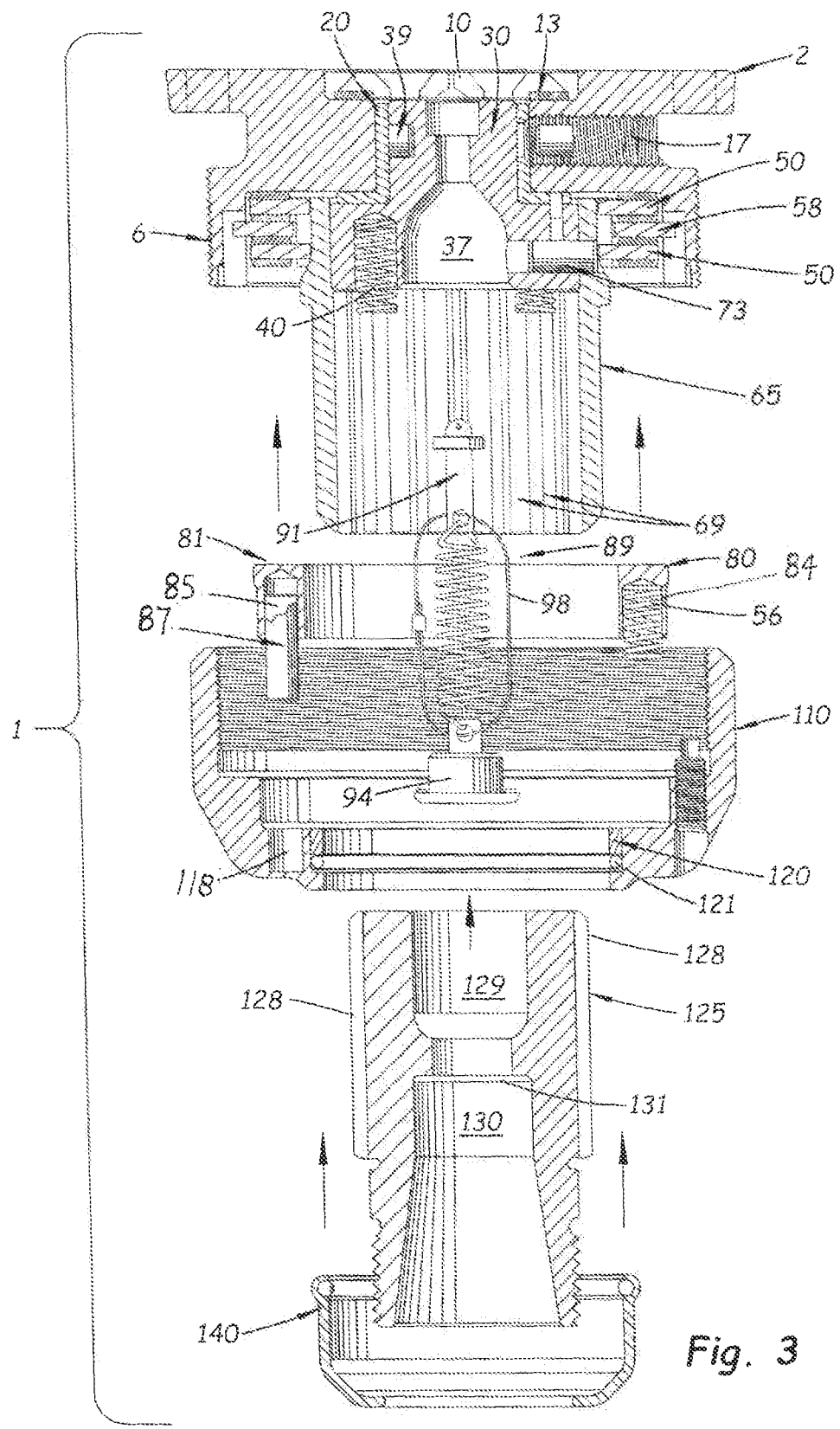
FIG. 3 is an exploded, sectional side elevational view of the tapping head.
Figure 4:
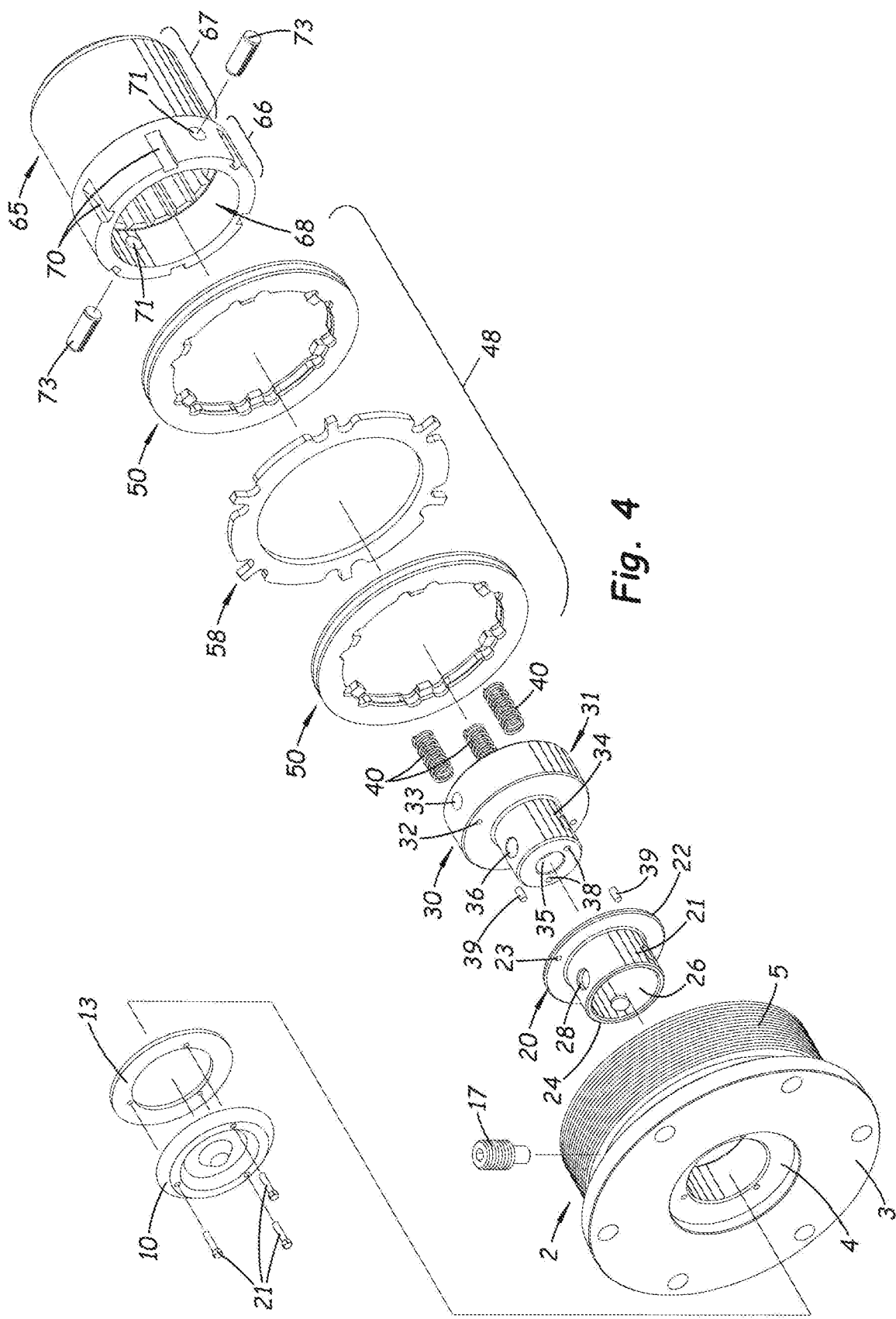
FIG. 4 is an exploded perspective view of the tapping head with an axially aligned showing base, the bearing bushing, the clutch pack, and the drive sleeve.
Figure 5:
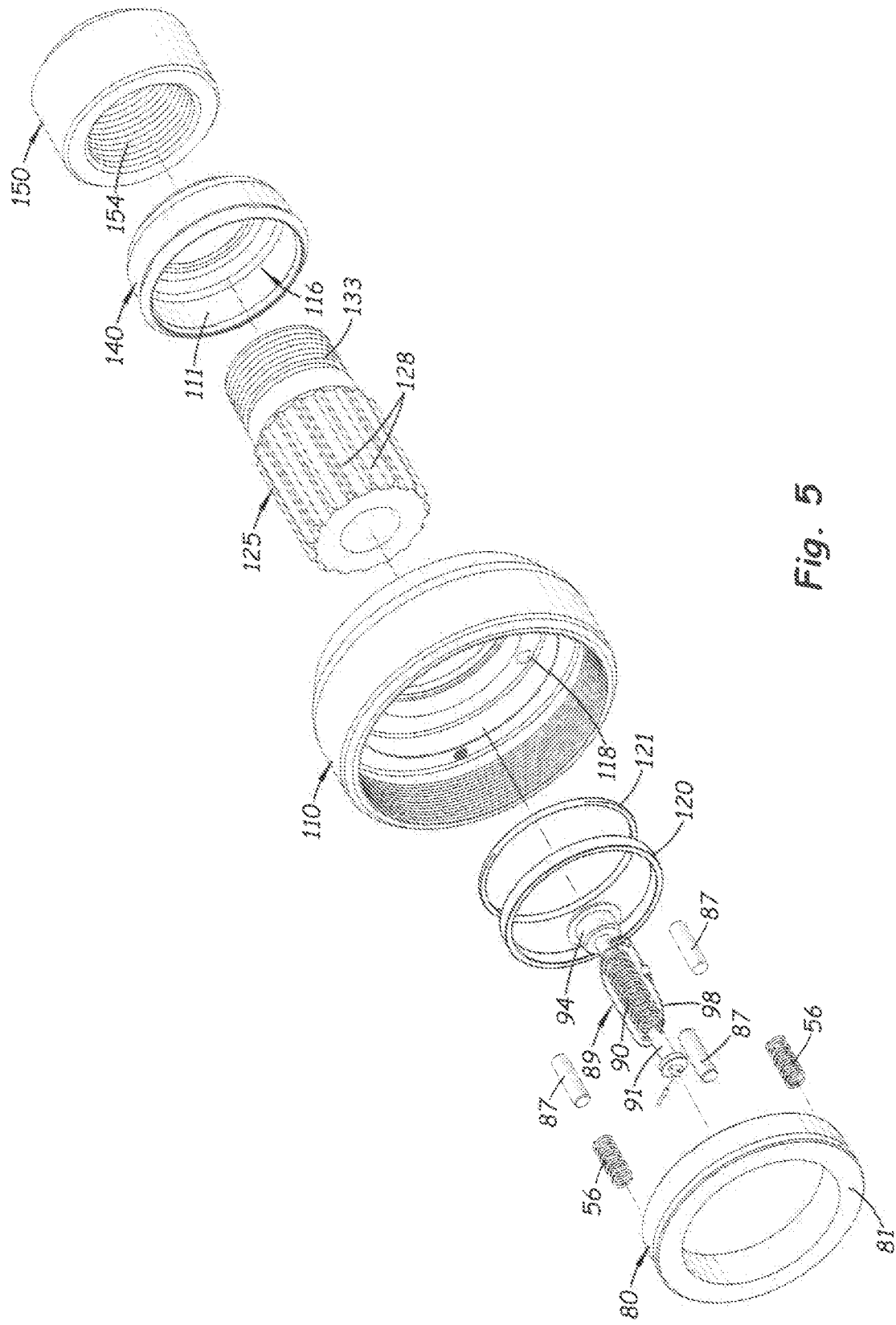
FIG. 5 is an exploded, perspective view of the pressure ring, two thrust springs, a retainer spring assembly, a clutch cover, the driver, the driver cover, and a lock nut.

FIGS. 1-3 show assembled views of the tapping head 1 while FIGS. 4 and 5 show exploded views of the tapping head's upper and lower assemblies. The tapping head 1 includes five main components longitudinally aligned in the following order: a base 2, a flanged bearing bushing 20, a drive coupler 30, a drive sleeve 65, and a lock nut 150. Disposed inside the base 2 is a pressure ring 80 and disposed around the bearing bushing 20, the drive coupler 30, and the drive sleeve 65 shown in FIG. 5.

Figure 6:
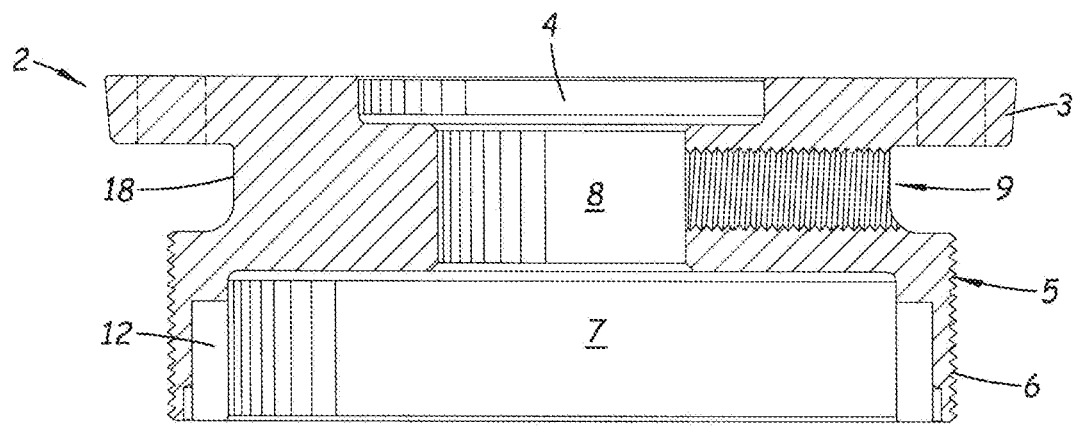
FIG. 6 is a sectional, side elevational view of the base.

As shown more clearly in FIG. 6, the base 2 includes an upper flange 3 and a perpendicularly aligned lower threaded cylindrical body 5. Formed between the upper flange 3 and the cylindrical body 5 is a recessed neck 18. Formed centrally on the upper flange 3 is a coaxially aligned recessed cavity 4. Formed on the inside of the cylindrical body 5 is a lower cylindrical cavity 7. Formed inside the recessed cavity 4 is an axially aligned narrow neck bore 8 that communicates with the lower cylindrical cavity 7.

Formed on the recessed neck 18 is at least one optional dog screw bore 9 shown more clearly in FIG. 6. The bore 9 is perpendicularly aligned with the base's center axis and communicates with the lower cylindrical cavity 7. During assembly, a threaded dog screw 17 is inserted into the bore 9 as shown in FIGS. 3 and 4. When tightened into the bore 9, the tip of the dog screw 17 extends inward and engages bore 28 on hearing bushing 20 to lock the base 2 and the bearing bushing 20 together.

Figure 7:
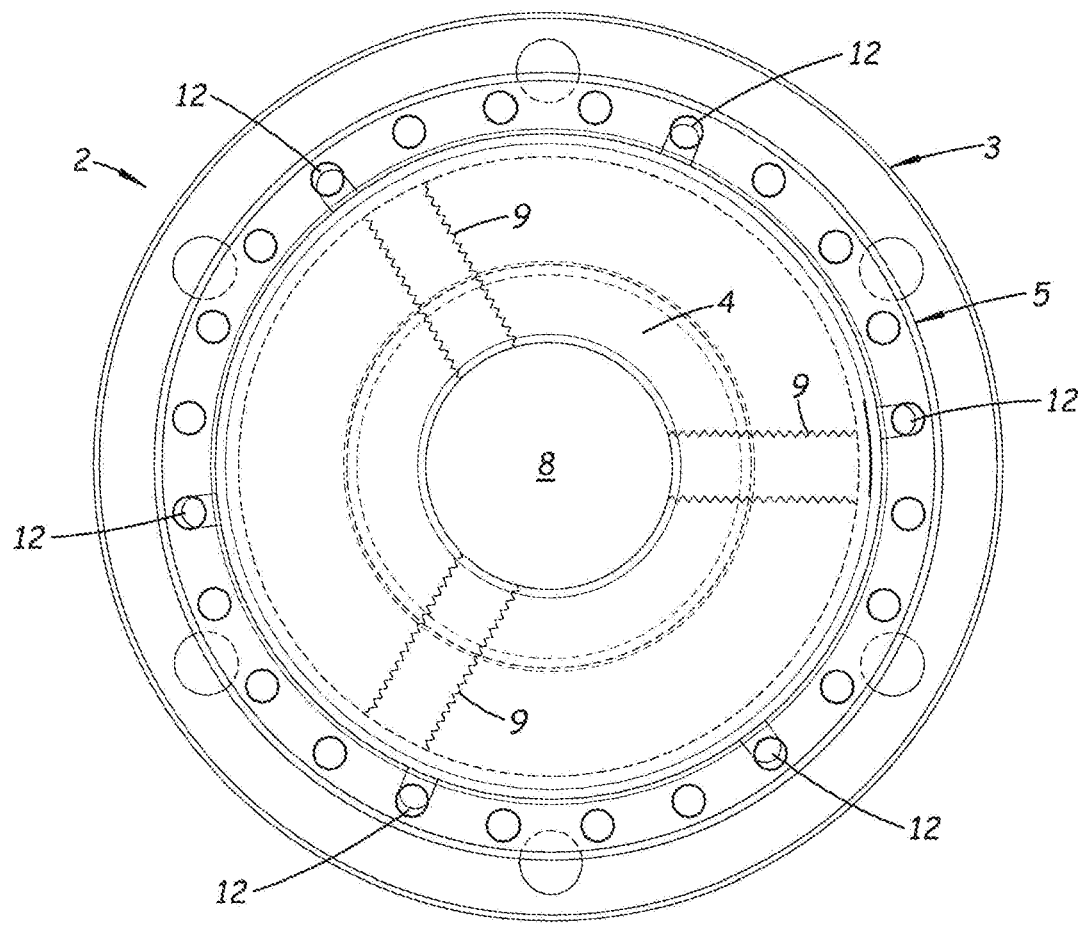
FIG. 7 is a top plan view of the base.

As shown in FIG. 7, formed on the inside surface of the lower cylindrical cavity 7 are radially aligned tang slots 12 that receive inner tangs 52 formed the two clutch discs 50 discussed further below.

As shown in FIGS. 2-4, disposed inside the base's recessed cavity 4 is a rigid, flat thrust plate 10. Located under the thrust plate 10 is a Hat washer 13. Extending downward from the thrust plate 10 are three screws 21 that connect to the upper neck 34 on the drive coupler 30 when inserted into the base 2. The thrust plate 10 holds the drive coupler 30 onto the base 2 and allows the drive coupler 30 to rotate when the dog screws 17 are not used as discussed further below.

Located inside the recessed cavity 4 in the base 2 is a bearing bushing 20. The bearing bushing 20, shown more clearly in FIGS. 4, 8 and 9, includes a lower thin circular flange 22 and a perpendicularly aligned neck 24. Extending axially through the flange 22 and the neck 24 is a center bore 26. Formed on opposite sides of the flange 22 are at least two pinholes 23. Formed on the sides of the neck 24 are three, equally spaced apart dog holes 28.

Located below and aligned coaxially with the bearing bushing 20 is a drive coupler 30 with a cylindrical body 31 and an upward extending perpendicularly aligned neck 34. The drive coupler 30, shown more clearly in FIGS. 10 and 11, has an axially aligned center bore 35 that extends through the neck 34 and communicates with a large, domed-shaped cavity 37 formed in the cylindrical body 31.

During assembly, the neck 34 on the drive coupler 30 is inserted into the center bore 26 formed in the bearing bushing 20. The top surface of the neck 34 is registered with the top edge of neck 26 and the top surface of the cylindrical body 31 is positioned tinder the base's circular flange 22. Formed on the perimeter edge of the top surface of the neck 34 are three bores 38 that receive the three screws 21 that extend downward from the thrust plate 10. As mentioned above, the screws 21 extend through the center hole formed in the base 2 and hold the neck 34 of the drive coupler 30 inside the cylindrical body 5.

Also, formed on the neck 34 are three laterally aligned neck bores 36 that are aligned and registered with dog holes 28 formed on the bearing bushing 20.

Formed on the top surface of the cylindrical body 31 of the drive coupler 30 are axially aligned pinholes 32 which are aligned and registered with pinholes 23 formed on the circular flange 22 on the bearing bushing 20. Formed on the sides of the cylindrical body 31 are three dog holes 33 that communicate with the dog holes 28 on the bearing bushing 20 and with the dome cavity 37 in the drive coupler 30. Extending upward in the sidewall of the cylindrical body 21 and equally spaced apart around the dome cavity 37 are three axially aligned spring slots 39.

Located around the cylindrical body 31 on the drive coupler 30 is the drive sleeve 65. The drive sleeve 65, shown more clearly in FIGS. 12 and 13, includes an upper region 66 and a lower region 67. Formed inside the drive sleeve 65 is a center bore 68. Formed on the inside surface of the lower region 67 are axially aligned, internal splines 69. Formed on the outside surface of the upper region 66 are four axially aligned tang slots 70. Formed on the upper region 68 are two pinholes 71.

During assembly, the bearing bushing 20 is axially aligned with and fits over the neck 34 on the drive coupler 30. Next, the pinholes 23 on the bearing bushing 20 are aligned with the pinholes 32 formed on the drive coupler 30. Two dog pins 39, shown in FIG. 4, are then inserted into the pinholes 23, 32 to align axially and couple the bearing bushing 20 to the drive coupler 30.

After being assembled, the bearing bushing 20 and the drive coupler 30 are then inserted into the cylindric cavity 7 formed on the base 2. The neck 24 on the bearing bushing 20 fits into the base's neck bore 8, and the dog holes 28 and 38 on the necks 24, 34, respectively, are aligned with the threaded dog holes 9 formed on base 2. The drive screws 17 are then inserted into the threaded screw bores 9 and into dog holes 28 and bore 38 to couple the base 2, the bearing bushing 20, and the drive coupler 30 together, forming a single locked, three-part structure.

Also, during assembly, the cylindrical body 31 on the drive coupler 30 slides into the upper region 66 on the drive sleeve 65. The cylindrical body 31 is rotated so the dog holes 33 are aligned with the pinholes 71 formed on the drive sleeve 65. A dowel pin 73 is then inserted into each pair of aligned holes 33, 71, to couple the drive coupler 30 to the drive sleeve 65.

The outer diameter of the drive sleeve 65 is less than the inside diameter of the cylindrical lower cavity 7 on the base 2. During assembly, the drive sleeve 65 is inserted into the lower cylindrical cavity 7. A circular space 77 is created between the outer surface of the drive sleeve 65 and the inside surface of the cylindrical lower cavity 7. Inserted into this circular space 77 is a clutch pack 48 that comprises two circular, flat friction discs 50 stacked on opposite sides of a flat support disc 58.

As shown in FIGS. 14 and 15, each friction disc 50 includes a center support ring 51 with abrasive layers 52, 53 formed on opposite sides near the perimeter edge. Each friction disc 50 has a center opening 54. Formed on the support ring 51 are four inward extending tangs 55.

Figure 16:
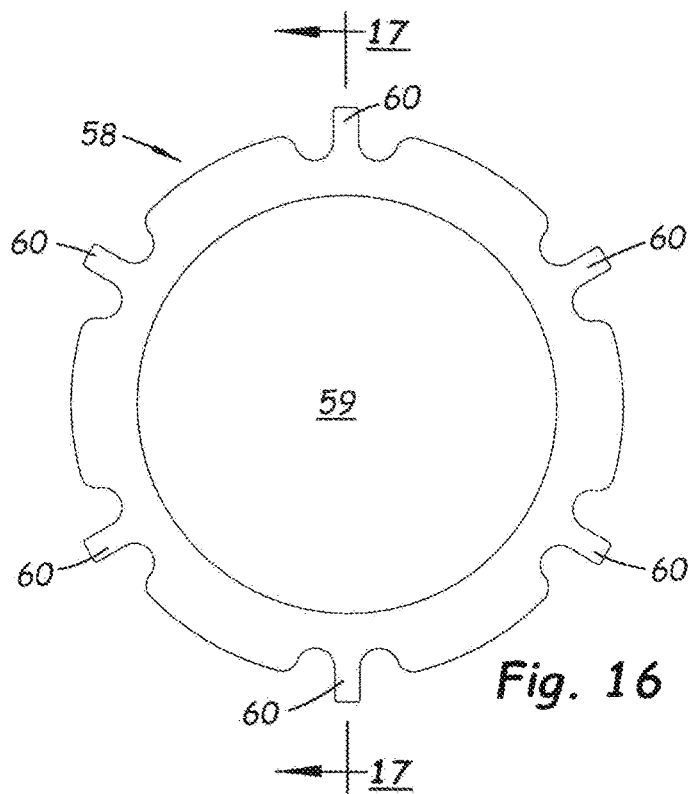
FIG. 16 is a top plan view of a support disc.
Figure 17:
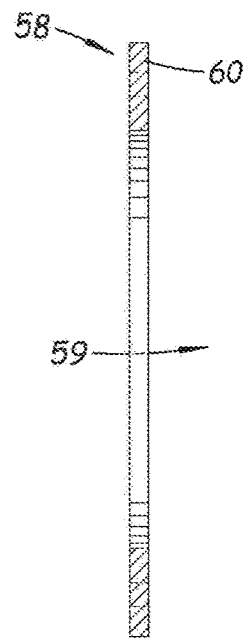
FIG. 17 is a sectional, side elevational view of the support disc taken along line 17-17 in FIG. 16.

The support disc 58, shown more dearly in FIGS. 16 and 17, is a single flat ring made of metal with a center opening 59 and four outward extending outer tangs 60. During assembly, the two friction discs 50 and the support disc 58 are stacked together to form a clutch pack 48. The friction discs 50 and the support disc 58 are rotated so the inner tangs 55 on the two friction discs 50 are aligned and extended inward and engage the tang slots 70 formed on the drive sleeve 65. The tang slots 70 are longer than the widths of the tangs 52 so the tangs 52 may 'float' or move axially over the drive sleeve 65. The outer tangs 60 formed on the support disc 58 extend outward and engage the tang slots 12 formed on the lower cavity 7 on the base 2, shown more clearly in FIGS. 6 and 7. When assembled, the base 2, drive coupler 30, drive sleeve 65 and support disc 58 are locked and rotated as a single structure.

Figure 18:
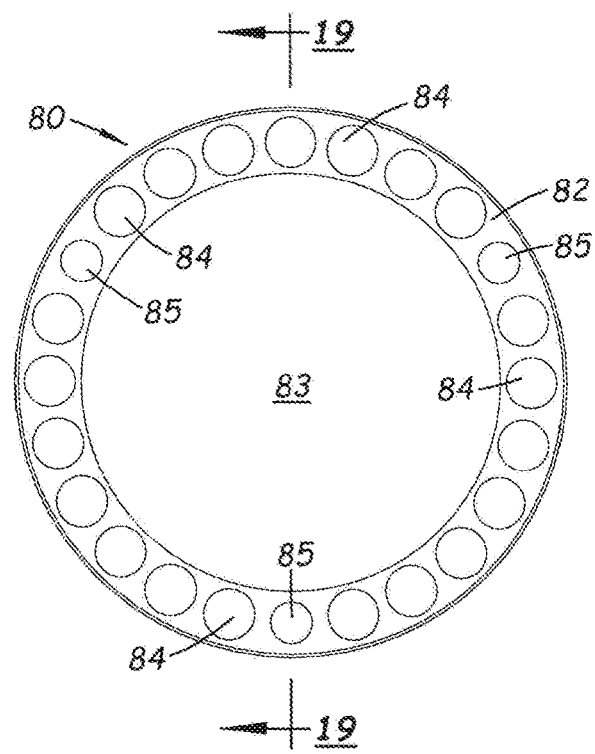
FIG. 18 is a bottom plan view of the pressure ring.
Figure 19:
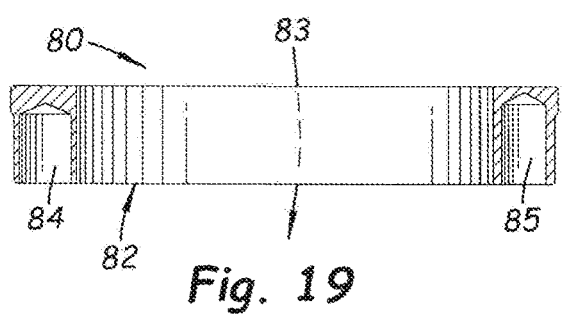
FIG. 19 is a sectional, side elevational view of the pressure ring taken along line 19-19 in FIG. 18.
Figure 23:
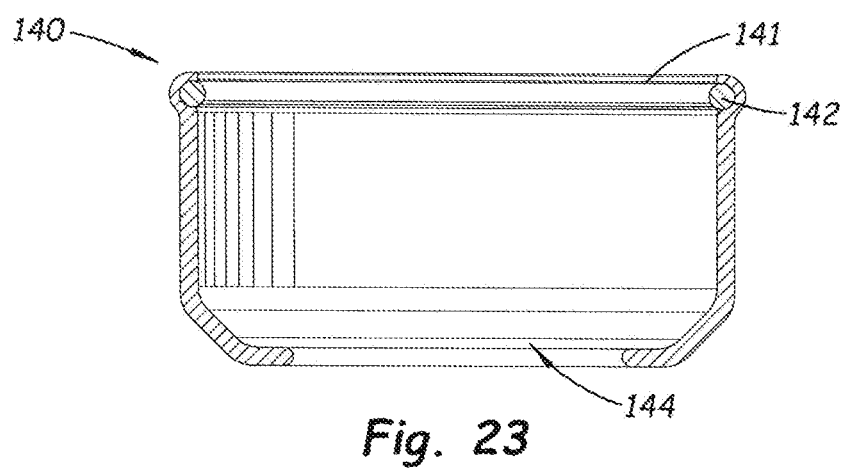
FIG. 23 is a sectional side elevational view of the driver cover.

As shown in FIG. 2, disposed inside the lower cavity 7 formed on the base 2 is a pressure ring 80 shown more clearly in FIGS. 18 and 19. The pressure ring 80 includes a flat top surface 81, a flat bottom surface 82, a center bore 83 and twenty-one downward extending clutch spring bores 84 formed on its bottom surface 82. Inserted into each clutch spring bore 84 is a clutch spring 56. Also formed on the bottom surface 82 of the pressure ring 80 are three peg bores 85 that receive drive pins 87 that extend upward from holes 118 formed in the clutch cover 110. The drive pins 87 rotatably lock the pressure ring 80 to the clutch cover 100. The pressure ring 80 can move axially inside the clutch cover 110. The clutch springs 56 disposed between the pressure ring 80 and the clutch cover 100 force the pressure ring 80 against the clutch pack 48.

Also, extending between the clutch cover 110 and the base 2 are one or more set screws 75 that the operator uses to lock the clutch cover 110 onto the base 2 after the clutch corer 110 has been tightened to its desired location. Each set screw 75 includes an upper tab that fits into one of a plurality of small bores 12 formed on the bottom surface of the base (see FIG. 7).

Extending inside the center bore 68 of the drive sleeve 65 is an elongated driver 125 shown in FIGS. 5 and 20. The driver 125 includes an elongated cylindrical body 126 with an axially aligned center bore 127. Formed on the upper region of the cylindrical body 126 are external elongated splines 128. Formed inside the upper region of the cylindrical body 126 is an upper cavity 129. Formed below the upper cavity 129 is a middle cavity 130. The middle cavity 130 is slightly larger in diameter than the upper cavity 129, thereby forming a circular shoulder between the upper cavity 129 and the middle cavity 130. Formed below the middle cavity 130 is a lower cavity 132 with tapered side walls 134. Formed on the lower region of the cylindrical body 126 are external threads 133 that connect to a lock nut 150.

The drive coupler 30 includes a plurality of spring slots 39 each configured to receive a thrust spring 40. During assembly, one end of a thrust spring 40 is placed inside each spring slot 39 and the opposite end presses against the upper end surface of the driver 125 when the driver 125 is placed inside the drive sleeve 65. Thrust springs 40 exert a downward force on the driver 125 thereby providing a 'soft engagement' for the tap 210.

Disposed around the clutch pack 48 and attached to the base 2 is a clutch cover 110. The clutch cover 110, shown more clearly in FIGS. 21 and 22, is cylindrical with a top opening 111, a center bore 112, a lower cavity, and a lower opening 117. The upper region of center bore 112 includes internal threads 113 configured to mesh with external threads 6 formed on the base 2. Located inside the clutch cover 110 and below the internal threads 113 are three coaxially aligned flange surfaces—upper flange surface face 114A, a middle flange surface 114B, and a lower flange surface 114C. Formed on the middle flange surface 114B are three evenly spaced apart threaded set screw bores 115. Located inside each set screw bore 115 is a set screw 75 shown in FIGS. 2 and 5. Each set screw 75 includes a tip that extends upward and is inserted into a tang slot 12 formed on the bottom of the base 2 when attached to the clutch cover 110 as shown in FIG. 2.

After assembly, the lower ends of clutch springs 56 press against the flange surface 114 to force the clutch pack 48 upward.

Installed inside the center bore 112 and below the flange surface 114 is a bronze bearing 120. Mounted under the bearing 120 is an upper O-ring 121 that fits into a o-ring raceway formed along the upper edge of the drive cover 140.

The o-ring 121 creates a water-tight seal between the drive cover 140 and the clutch cover 110.

During assembly, the clutch cover 110 is aligned with the base 2 so that the clutch cover's internal threads 113 mesh with the external threads 6 formed on the base 2. As the clutch cover 110 is rotated and tightened on the base 2, compressing forces are exerted by the clutch springs 56 on the clutch pack 48. By tightening or loosening the clutch cover 110 on the base 2, the operator can adjust the amount of force exerted on the clutch pack 48 and control the amount of slippage. The set screws 75 are then tightened to lock the clutch cover 110 to the base 2.

Disposed between the base 2 and the clutch cover 110 is a retainer ring assembly 89 that prevents the clutch cover 110 from being excessively pulled away from the base 2. The retainer spring assembly 89 includes a retainer spring 90, an upper cap 91, a lower adapter cap 94, and an optional limit wire 98. During assembly, the upper cap 91 includes a wide head that is inserted into an upper recessed cavity formed on the neck 34 of the drive coupler 30 Attached to the head is a shaft that is sufficient in length to extend 30 and into the dome cavity 37 formed inside the drive coupler 30. Formed on the tower end of shaft is a hole.

The lower adapter cap 94 is inserted into the lower cavity 130 and presses against the shoulder 131 in the driver 125. The upper end of the lower adapter cap 94 includes an extension tab with a hole. The extension tab is positioned in the upper cavity 129 and the adapter cap 94 is positioned in the lower cavity 130 (see FIG. 2). The retainer spring 90 includes two opposite end hooks that extend into the holes formed on the upper cap 91 and the lower adapter cap 94, respectively. Also, extending around the retainer spring 90 is an optional limit wire 98. When assembled, the driver 125 is coupled to the drive coupler 30 via the retainer spring assembly 89.

After inserting the driver 125 into the drive sleeve 65 and attaching the drive cover 140 to the drive sleeve 65, the lower threaded end of the driver 125 extends through the lower opening 144 formed on the drive cover 140. The lower edge of the drive cover 140 is inserted into a circular notch 135 formed on the outside surface of the driver 125. During use, the shaft 212 of a tap 210 is then inserted into the tapered, lower center cavity 132 formed in the driver 125. A lock nut 150, (also called a collet) is then attached to the external threads 133 on the driver 125. When the lock nut 150 is tightened, the tapered sidewalls of the driver 125 are forced inward and presses against the tap's shaft 212 to securely hold the tap 210 on the driver 125.

Assembly

To assemble the taping head 1, the cylindrical body 31 on the drive coupler 30 is inserted into the center bore 68 formed on the upper region 66 of the drive sleeve 65. The cylindrical body 31 is rotated so that the holes 33 are aligned with the pinholes 71 formed on the drive sleeve 65. A dowel pin 73 is (when inserted into each pair of aligned holes 33, 71, to connect the drive coupler 30 to the drive sleeve 65.

Next, the center bore 112 on the clutch cover 110 is extended over the driver 125 and the internal threads 113 are attached to the external threads 6 on the base 2. The clutch cover 110 is tightened onto the base 2 so that thrust springs 40 supply resistant force between the pressure ring 80 and the clutch cover 110 to create the desired frictional forces. The driver cover 140 is then attached to the end of the clutch cover 110. The driver cover of 140 includes a top opening 141. Inserted around the top opening 141 is an o-ring 142. A lock nut 150 is then attached to the external threads 133 on the driver 125.

Next, the thrust springs 40 are placed into the spring slots 39 on the drive coupler 30 and clutch springs 56 are inserted into each clutch spring bore 84 formed on the pressure ring 80.

Next, the retainer spring assembly 89 is attached to the drive coupler 30 and the driver 125.

Next, the center bore 112 on the clutch cover 110 is extended over the driver 125 and the internal threads 113 are attached to the external threads 6 on the base 2. The clutch cove 110 is tightened onto the base 2 so that thrust springs 40 supply resistant force between the pressure ring 80 and the clutch cover 110 to create the desired frictional forces. The driver cover 140 is then attached to the end of the clutch cover 110. A lock nut 150 is then attached to the external threads 133 on the driver 125.

Operation

During use, the base 2 is bolted to a spindle 200 attached to a CNC machine. When the spindle 200 is activated and begins to rotate, the base 2 rotates. When the clutch cover 10 110 is tightened on the base 2, the clutch pack 48 begins to rotate. Rotation of the clutch pack causes the pressure ring 80 to rotate. When the clutch cover 110 is rotated on the base 2 to adjust the amount of slippage. As stated above, by loosening or tightening the clutch cover 110 on the base 2, the amount of pressure exerted by the thrust springs 40 on the pressure ring 80 is adjusted.

During operation, the spindle 200 causes the base 2 to rotate which causes the drive coupler located inside the base 2. Because the clutch pack 48 is pressed against the drive coupler 30, rotation of the drive coupler 20 causes the drive sleeve 65 and the driver 125 to rotate. When the tap 210 undergoes torque that exceeds the frictional forces exerted by the clutch pack 48, the clutch pack 30 will automatically slip to prevent damage to the tap 210.

Because the drive sleeve 65 can slide axially over the driver 125, damage to the tap 210 is prevented.

As stated above, the operator may tighten the dog screw 17 into the bore 9 located on the base 2 to lock the base 2 to the bearing bushing 20 and drive coupler 30. Fixing the base 2 to the bearing bushing 20 and the drive coupler 30 disengages operation of the clutch pack 48 so that the driver 125 rotates with the drive coupler 30.

In compliance with the statute, the invention described has been described in language more or less specific on structural features. It should be understood however, that the invention is not limited to the features shown, since the means and construction shown, comprises the preferred embodiments for putting the invention into effect. The invention is therefore claimed in any of its forms or modifications within the legitimate and valid scope of the amended claims, appropriately interpreted under the doctrine of equivalents.

I claim:

1. A tapping head, comprising:
   a. a base with an upper flange, a cylindrical body, an upper neck bore and a lower cylindrical cavity, formed on said cylindrical body are external threads;
   b. a drive coupler axially aligned with said base, said drive coupler includes a lower cylindrical body and an upper neck, said upper neck being inserted into said upper neck bore formed on said base and said lower cylindrical body being inserted into said lower cylindrical cavity formed on said base;

c. a drive sleeve coaxially aligned with said base and said drive coupler, said drive sleeve includes a center bore with a plurality of longitudinally aligned internal splines formed thereon, said center bore being inserted around said lower cylindrical body on said drive coupler;

d. a clutch pack located inside said lower cylindrical cavity formed on said base, said clutch pack being placed around said drive sleeve;

e. a pressure ring axially aligned with and extending around said drive sleeve, said pressure ring includes a flat top surface configured to press against said clutch pack, said pressure ring includes a plurality of downward extending clutch springs;

f. a clutch cover with a center bore, a top opening, and a lower opening, formed inside said center bore are internal threads configured to mesh with said external threads on said base, said clutch cover includes a flange surface configured to press against said clutch springs when said clutch cover is axially aligned and attached to said base;

g. a driver configured to slide axially into said center bore formed in said clutch cover and into said center bore formed in said drive sleeve, said driver includes a plurality of external splines configured to mesh with said internal splines in said drive sleeve, said driver being an elongated structure with tapered sidewalls that extend below said clutch cover, said sidewalls surrounding a lower cavity configured to receive the shaft of a tap, formed on said sidewall are external threads;

h. a plurality of thrust springs extending between said drive coupler and said driver;

i. a retainer spring assembly connected at one end to said drive coupler and connected at an opposite end to said driver, said retainer spring assembly configured to apply an upward biasing force to said driver;

j. a drive cover extending over said driver and attaching to said clutch cover; and k. a lock nut configured to attach to said external threads on said driver to selectively attach a tap to said driver.

2. The tapping head, as recited in claim 1, further including a recessed cavity formed on said base and a thrust plate located inside said recessed cavity, said thrust plate being connected to said drive coupler.

3. The tapping head, as recited in claim 2, further including a bearing bushing inserted into said upper neck bore formed in said base, said bearing bushing configured to surround said upper neck of said drive coupler when said drive coupler is inserted into said lower cylindrical cavity in said base.

4. The tapping head, as recited in claim 2, wherein said pressure ring includes a flat top surface, a flat bottom surface, a center bore and a plurality of downward extending spring bores, inserted into each said spring bore is one said thrust spring, said pressure ring also includes at least three peg bores with downward drive pins.

5. The tapping head, as recited in claim 1, further including a bearing bushing inserted into said upper neck bore formed in said base, said bearing bushing configured to surround said upper neck of said drive coupler when said drive coupler is inserted into said lower cylindrical cavity of said base.

6. The tapping head, as recited in claim 5, wherein said clutch pack includes at least one friction disc and a support disc, said friction disc being coupled to said drive sleeve and said support disc being coupled to said base.

7. The tapping head, as recited in claim 5, wherein said pressure ring includes a flat top surface, a flat bottom surface, a center bore and a plurality of downward extending spring bores, inserted into each said spring bore is one said thrust spring, said pressure ring also includes at least three peg bores with downward drive pins.

8. The tapping head, as recited in claim 1, wherein said clutch pack includes at least one friction disc and a support disc, said friction disc being coupled to said drive sleeve and said support disc being coupled to said base.

9. The tapping head, as recited in claim 8, further including drive pins extending downward from said pressure ring and holes formed on said clutch cover configured to receive said drive pins.

10. The tapping head, as recited in claim 1, wherein said pressure ring includes a flat top surface, a flat bottom surface, a center bore and a plurality of downward extending spring bores, inserted into each said spring bore is one said thrust spring, said pressure ring also includes at least three peg bores with downward drive pins.

11. The tapping head, as recited in claim 1, further including drive pins extending downward from said pressure ring and holes formed on said clutch cover configured to receive said drive pins.

12. The tapping head, as recited in claim 1 wherein said retaining spring assembly includes a retainer ring, an upper cap and a lower cap, said upper cap being attached to one end of said retainer ring and held in a fixed position on said drive coupler said lower cap being attached to an opposite end of said retainer ring and held in a fixed position to said driver.

13. The tapping head, as recited in claim 1 wherein said retaining spring assembly includes a retainer ring, an upper cap and a lower cap, said upper cap being attached to one end of said retainer ring and held in a fixed position on said drive coupler said lower cap being attached to an opposite end of said retainer ring and held in a fixed position to said driver.

14. The tapping head, as recited in claim 1, further including at least one dog screw attached to said base, said dog screw configured to selectively lock said drive coupler to said base.

15. The tapping head, as recited in claim 1, further including at least one dowel pin connecting said drive sleeve to said drive coupler.

16. A dual operating tapping head, comprising:
a. a base with a cylindrical body, an upper neck bore and a lower cylindrical cavity with external threads;
b. a drive coupler axially, aliened with said base, said drive coupler includes a lower cylindrical body and an upper neck, said upper neck being inserted into said upper neck bore formed on said base and said lower cylindrical body being inserted into said lower cylindrical cavity formed on said base;
c. a drive sleeve coaxially aligned and affixed to said base, said drive sleeve includes center bore with a plurality of longitudinally aligned internal splines formed thereon;
d. a driver configured to slide axially into said center bore in said drive sleeve, said driver includes an upper region with a plurality of external splines configured to mesh with said internal splines in said drive sleeve thereby enabling said driver to move axially, inside said drive sleeve, said driver includes a lower cavity configured to receive the shaft of a tap and a lower region with external threads;

e. an adjustable clutch pack disposed between said base and said drive sleeve;

f. a clutch cover disposed over said adjustable clutch pack and attached to said base;

g. a retainer spring assembly connected at one end to said drive coupler and connected at an opposite end to said driver;

h. a drive cover extending over said driver and attaching to said clutch cover;

i. a lock nut configured to attach to said external threads on said driver to selectively attach a tap to said driver; and j. at least one dog screw to selectively lock said drive coupler to said base.

17. The tapping head, as recited in claim 16 wherein said retainer spring assembly includes a spring, an upper cap attached at one end of said spring and a lower cap attached at an opposite end of said spring, said upper cap being retained by said base and said lower cap being retained by said driver.

18. The tapping head, as recited in claim 16, wherein said clutch pack includes an upper friction disc, a lower friction disc, and a support disc located between said upper friction disc and said lower friction disc, said upper friction disc being coupled to said base and said lower friction disc being coupled to said drive sleeve.

\* \* \* \* \*